(12) United States Patent
Fisher (10) Patent No.: US 12,360,437 B2
(45) Date of Patent: Jul. 15, 2025

(54) VERSATILE V FLAT DEVICE

(71) Applicant: Nathan Fisher, Monsey, NY (US)

(72) Inventor: Nathan Fisher, Monsey, NY (US)

( * ) Notice: Subject to any disclaimer, the term of this patent is extended or adjusted under 35 U.S.C. 154(b) by 100 days.

(21) Appl. No.: 18/378,647

(22) Filed: Oct. 10, 2023

(65) Prior Publication Data

US 2024/0118590 A1 Apr. 11, 2024

Related U.S. Application Data

(60) Provisional application No. 63/414,355, filed on Oct. 7, 2022.

(51) Int. Cl.
*G03B 15/06* (2021.01)
(52) U.S. Cl.
CPC .................. *G03B 15/06* (2013.01)
(58) Field of Classification Search
CPC ...................................... G03B 15/06
USPC ........................................... 936/1, 3
See application file for complete search history.

(56) References Cited

U.S. PATENT DOCUMENTS

| 4,651,371 A | * | 3/1987 | Hahn | A47G 9/0246 |
| | | | | 5/490 |
| 6,643,455 B1 | * | 11/2003 | Malmstrom | G03B 15/07 |
| | | | | 362/11 |
| 2012/0321286 A1 | * | 12/2012 | O'Connor | A63H 3/52 |
| | | | | 396/3 |
| 2018/0217476 A1 | * | 8/2018 | Sytnyk | G03B 15/10 |
| 2019/0101809 A1 | * | 4/2019 | Wehbe | G03B 15/06 |

OTHER PUBLICATIONS

V-Flat World, https://vflatworld.com/pages/foldable-v-flats, 11 pages (Year: 2021).*

* cited by examiner

*Primary Examiner* — Christopher E Mahoney
(74) *Attorney, Agent, or Firm* — Tarter Krinsky & Drogin LLP (57) ABSTRACT

A free-standing V Flat for photography and similar use formed of two panels joined at the center by a hinge or similar hinged attachment. A crossbar is provided to join the upper corners of the V Flat for securing the panels in an open position and for supporting backdrops and similar items. The crossbar is formed of two independent bar units that are configurable by a user to contact one another such that at least portions of each of the bar units overlap with one another. The degree of overlap determines the length of the resultant crossbar, thereby allowing a user to customize the crossbar to accommodate any of various angles assumed by the V Flat.

8 Claims, 13 Drawing Sheets

VERSATILE V FLAT DEVICE

RELATED APPLICATIONS

This application claims the benefit of U.S. Prov. Appl. No. 63/414,355 filed Oct. 7, 2022, the contents of which are incorporated by reference herein.

FIELD OF THE INVENTION

The invention relates to the field of V Flats, more specifically to a lightweight durable V Flat that is configured for attachment of accessories.

SUMMARY OF THE INVENTION

Embodiments of the invention provide a V Flat having panels formed of two layers of corrugated plastic fused together in opposing orientations. The panels are lightweight, yet highly durable.

Panels in accordance with embodiments are provided with Velcro strips that surround and frame the panel edges. Velcro used in embodiments of the invention have both hooks and loops such that it can universally attach either hooked or looped surfaces—or any of a variety of similar surfaces. The Velcro edges allow the V Flat of the invention to attach backdrops or similar sheets.

In embodiments of the invention, a specialized bar is provided for bridging the top corners of a deployed V Flat. In embodiments, two bars are provided that are attachable to form a singular crossbar. The crossbar can be added to the top of an open V Flat in order to provide support and/or to serve as an additional area for hanging or attaching backdrops and other devices.

BRIEF DESCRIPTION OF THE DRAWINGS

Illustrative embodiments of the invention will hereafter be described with reference to the accompanying drawings, wherein like numerals denote like elements.

DETAILED DESCRIPTION OF THE INVENTION

Embodiments of the present invention will now be described with reference to the above-identified figures of the drawings. However, the drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

Figure 1:
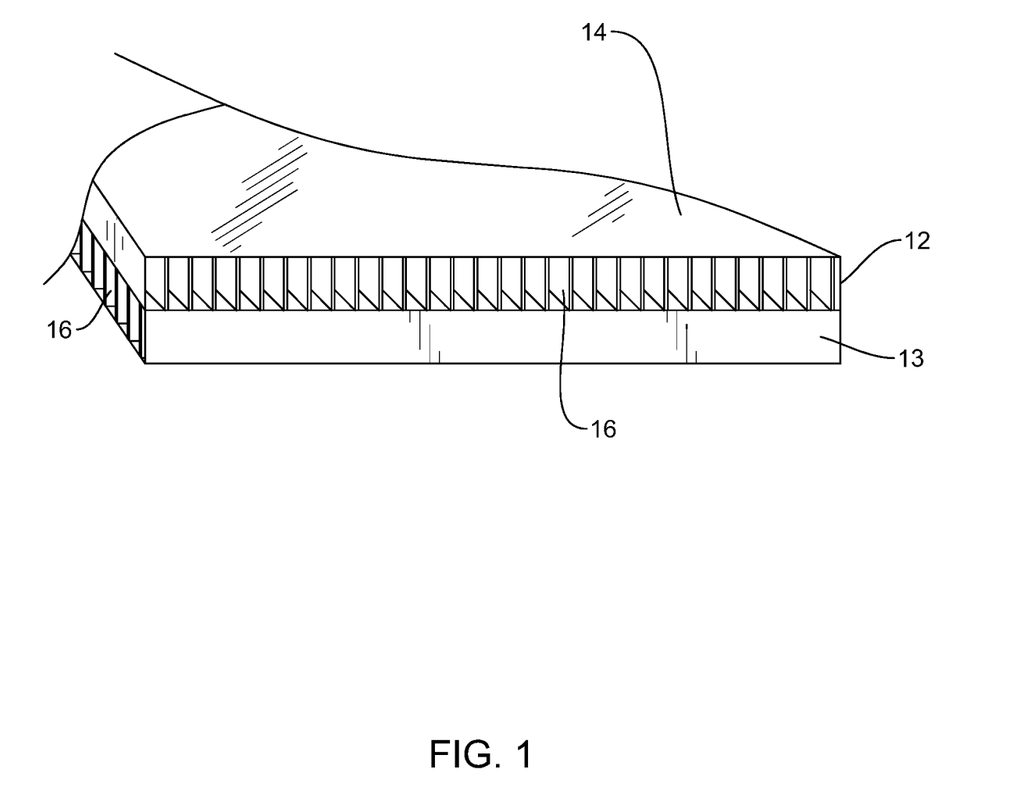
FIG. 1 is a perspective cross-sectional view through a portion of a panel in accordance with an embodiment of the invention.

With reference to FIG. 1 panels of the V Flat are formed of two cross-oriented sheets. In embodiments of the invention, sheets of corrugated plastic are utilized (e.g. 12, 13). Each sheet has a first face board (e.g. 14), a second face board and a series of flutes 16 or similar support structures running end to end. A second face board of a first sheet 12 is fused to a first face board of a second sheet 13. In embodiments respective flutes 16 of first and second sheets run perpendicularly to each other in a crisscross formation—thereby adding structural integrity to panels formed of fused sheets 12, 13. It will be understood that panels of the invention may be constructed from a single sheet of material without the need for doubling or cross-orientating sheets.

It will be further understood that sheets can be any color. The color may differ on either side, for example white on one side and black on the other side. The sheets can be used bare or, optionally, they may be covered with various kinds of material. In embodiments of the invention, V Flat 19 can be reversed by rotating panels inwards and outwards like a hinge.

Figure 2:
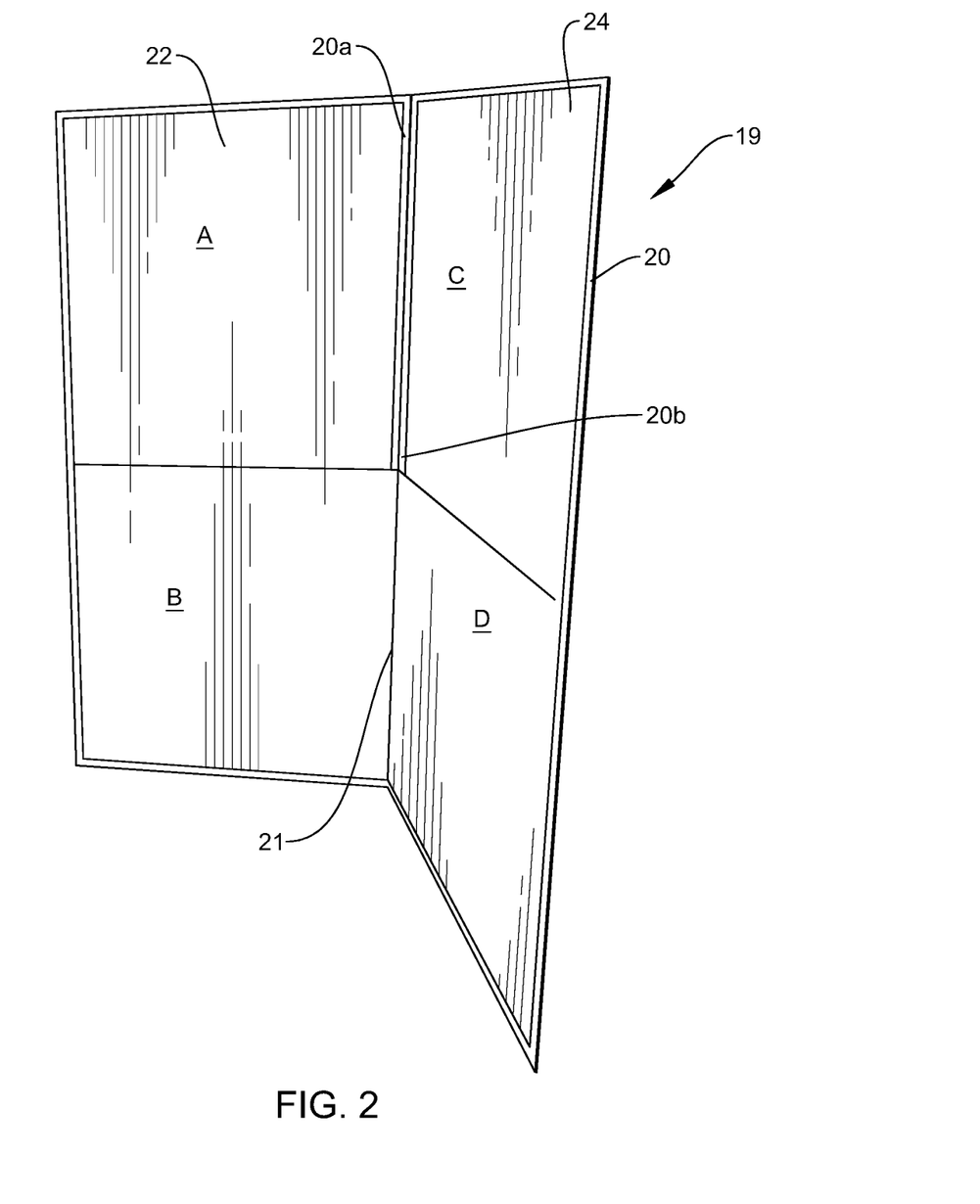
FIG. 2 is a perspective view of a panel system in accordance with an embodiment of the invention.

As shown, for example in FIG. 2, panels formed of corrugated plastic sheets are used to form a V-Flat unit 19 (see e.g. quadrants A-D). A first panel 22 is formed of un upper quadrant A and a lower quadrant B. A second panel 24 is formed of un upper quadrant C and a lower quadrant D. In embodiments of the invention, each quadrant is formed of fused cross-oriented sheets as described. A lower aspect of quadrant A is hingedly attached (e.g. via tape, fold or living hinge) to an upper aspect of quadrant B. A lower aspect of quadrant C is hingedly attached (e.g. via tape, fold or living hinge) to an upper aspect of quadrant D. A right side of quadrant B is hingedly attached (e.g. via tape, fold or living hinge) to a left side of quadrant D.

Figure 3:
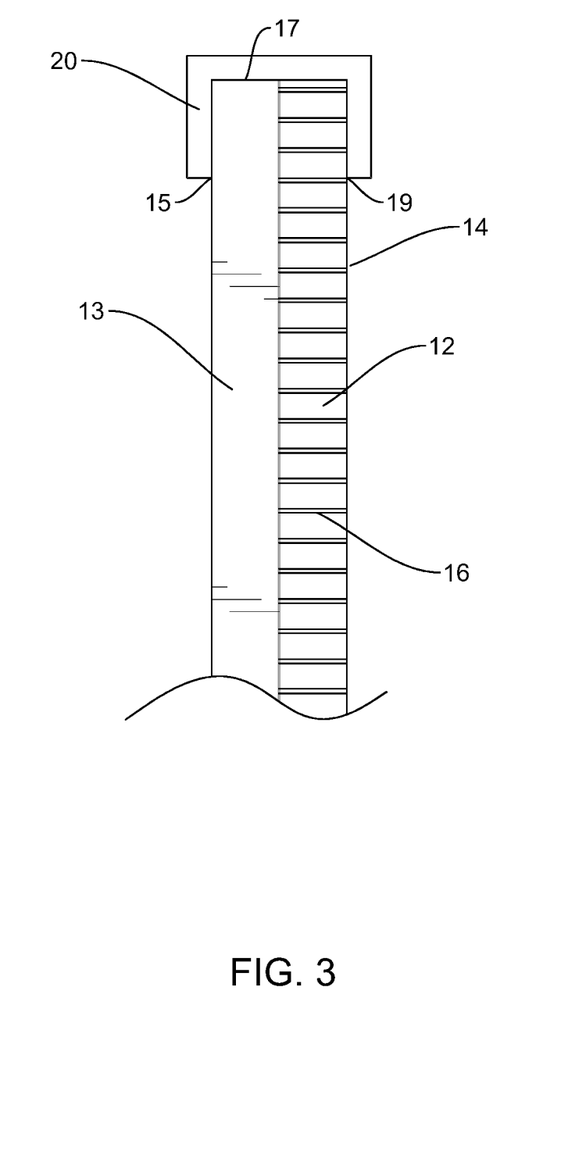
FIG. 3 is a cross-sectional view of an upper segment of a panel in accordance with an embodiment of the invention.

As further shown, panels in accordance with embodiments of the invention are surrounded by a Velcro strip 20. As shown in FIG. 2, Velcro strips 20 surround the ends or perimeter of panels. In this regard, a Velcro strip applied to a top perimeter area of a panel wraps around the edge of a panel and terminates on a perimeter area on a opposite side of the pane. For example, FIG. 3 shows a truncated cross-sectional view of an upper segment of a panel. As shown, a strip of Velcro 20 is positioned at a far (e.g. upper) edge (e.g. 15) of the panel and extends therefrom to bridge the end surface (e.g. top edge 17 as shown in FIG. 3) and continues to the opposite side of the panel terminating on an opposing edge (e.g. 19). In an embodiment of the invention, a continuous strip of Velcro is used. The Velcro strips provide adhesion surfaces for different attachments as described in more detail below—but they also serve to reinforce the panel end surfaces. This adds protection and cushion to the panel edges—lending to the overall durability of the panels.

In embodiments of the invention, a right side of quadrant A is provided with a Velcro strip (e.g. 20a) and left side of quadrant C is provided with a Velcro strip (e.g. 20b). Velcro strips 20a, 20b temporarily act as a living hinge between quadrants A and C when V-Flat unit 19 is deployed for use—but also allows these quadrants to be separated longitudinally so that they may be folded and stowed against lower quadrants B, D. In addition, a fold 21 or similar living hinge is provided between quadrants B and D that extends from the bottom of the unit 19 between quadrants B and D to the approximate halfway point between panels—allowing for the tops of panels (quadrants A and C) to fold downwardly (across folds or living hinges separating quadrants A and B and quadrants C and D, respectively) while quadrants B and D remain hingedly connected.

In embodiments of the invention, V-Flat stands freely on the ground when the two panels are opened and a first panel 22 is positioned at an angle with respect to the second panel 24.

Figure 4:
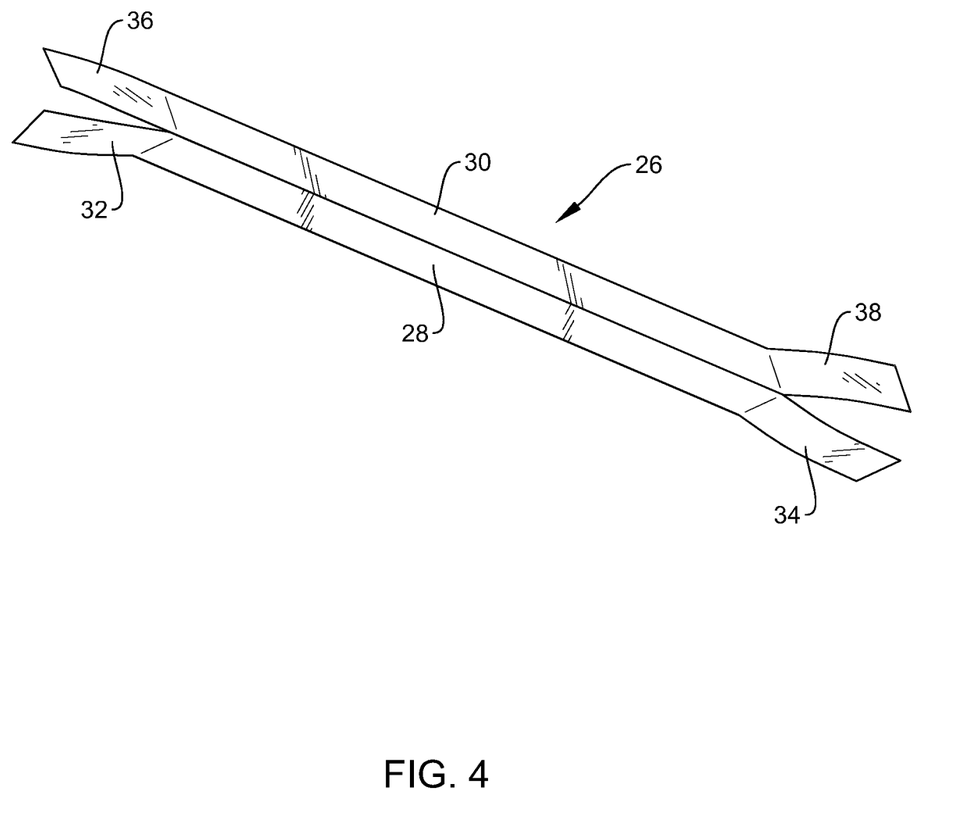
FIG. 4 is a top perspective view of a first bar unit in accordance with an embodiment of the invention.
Figure 13:
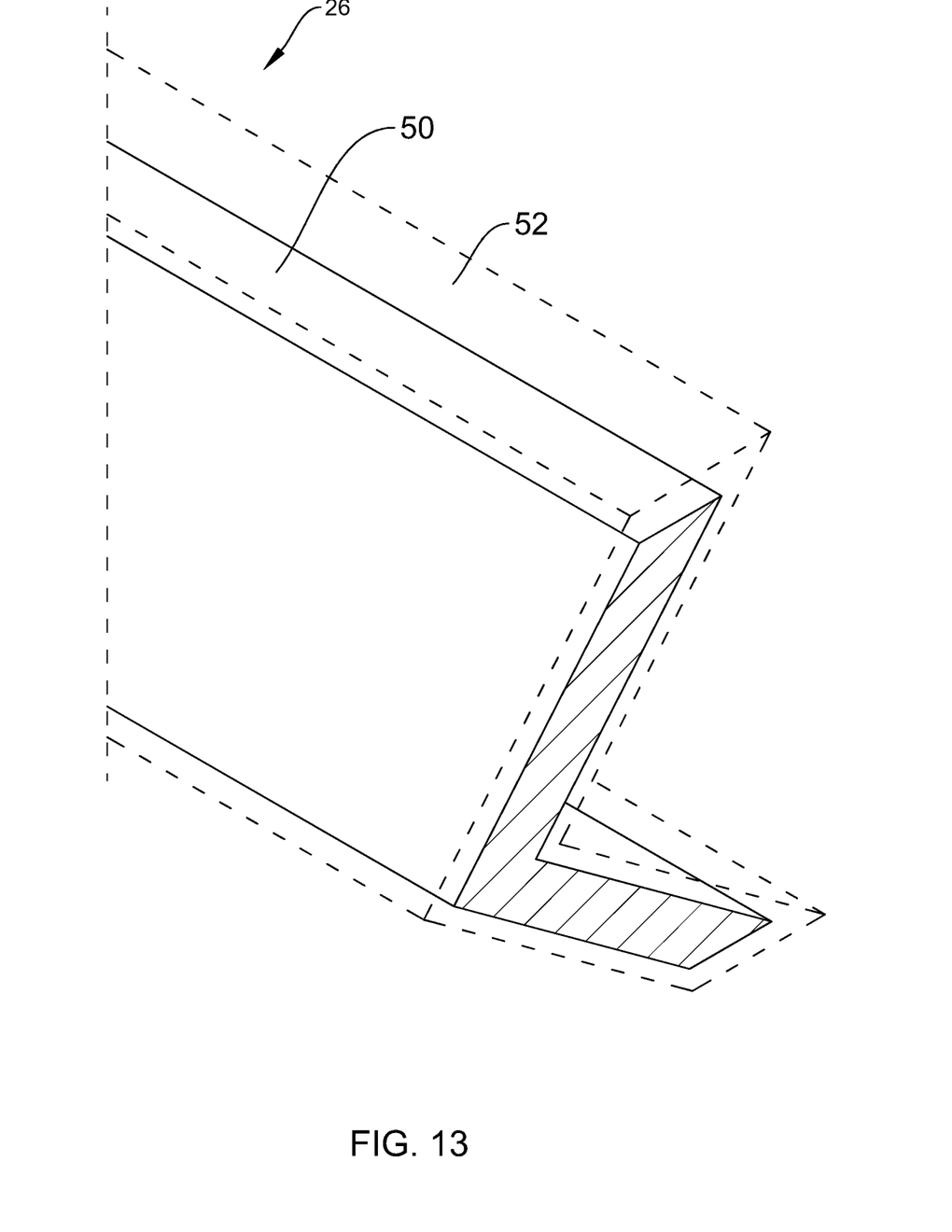
FIG. 13 is a cross-sectional schematic view of a bar and surrounding Velcro in accordance with an embodiment of the invention.

In embodiments of the invention, a crossbar system formed of at least two bar units is provided that is configured to run across the upper ends of panels (contacting top left corner of panel 22 and top right corner of panel 24) to stabilize the panels and to provide a surface for attaching accessories and the like. With reference to FIG. 4, bar 26 is formed of a first elongated panel 28 disposed at a substantial right angle to a second elongated panel 30. A first tail 32 extends from a first side of panel 28 and a second tail 34 extends from a second end of first elongated panel 28. Similarly, a first tail 36 extends from a first end of panel 30 and a second tail 38 extends from a second end of panel 30. In embodiments of the invention bar 26 is fully encased in Velcro and respective tails are formed of Velcro strips or are covered in Velcro. For example, with reference to FIG. 13 which show a cross-sectional view through a bar 26, an L-profiled (e.g. metal) bar is encased with a material 52 having Velcro elements on its face. In embodiments of the invention, Velcro used in embodiments of the invention are formed of, both, hook and loop members thereby universally adhering to either hook or loop materials.

Figure 5:
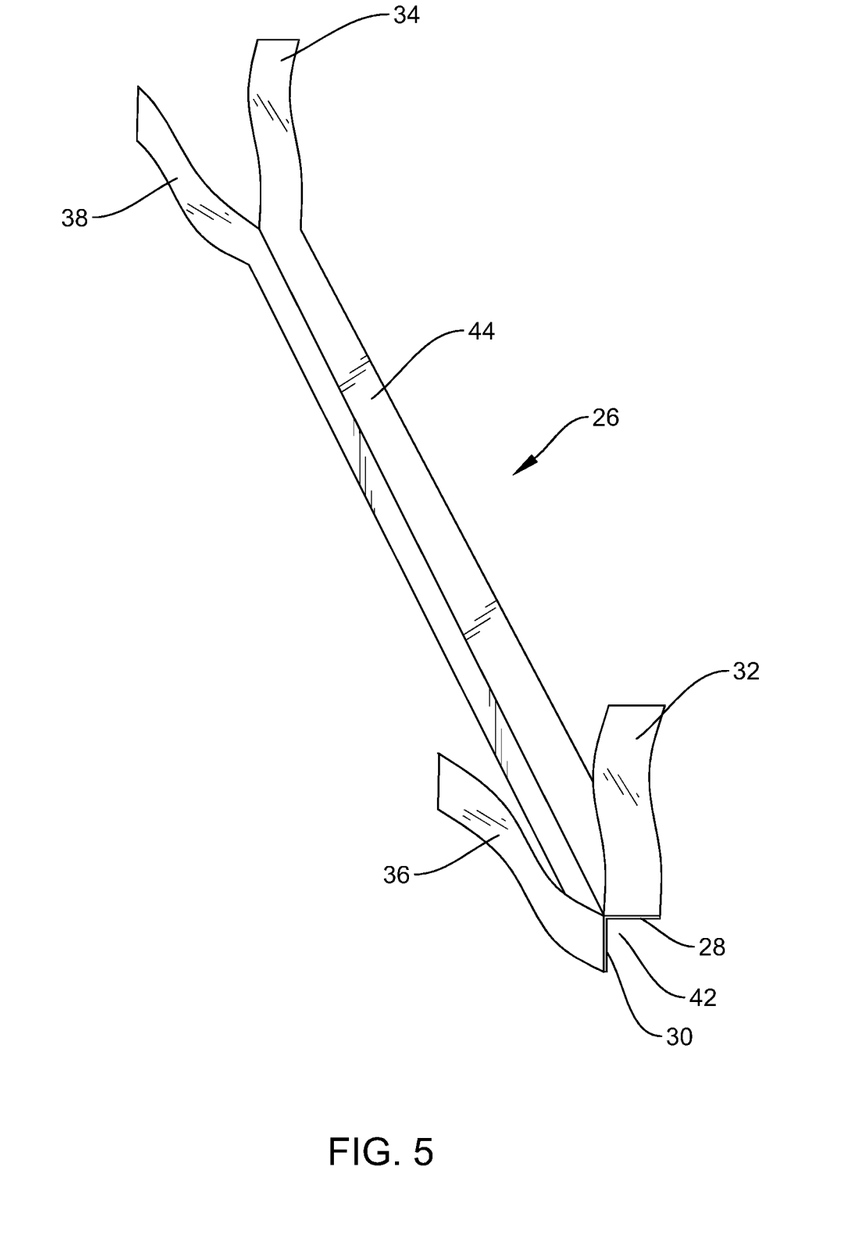
FIG. 5 is a top perspective view of a second bar unit in accordance with an embodiment of the invention.

As shown in FIG. 5, bar 26 has an inner surface 42 and an outer surface 44. In embodiments of the invention, bars 26 are substantially similarly sized such that inner surface (e.g. underside surfaces of panels 28, 30) may be configured to overlap with and contact outer surface 44 (e.g. outside surfaces of panels 28, 30) of a corresponding bar.

Figure 6:
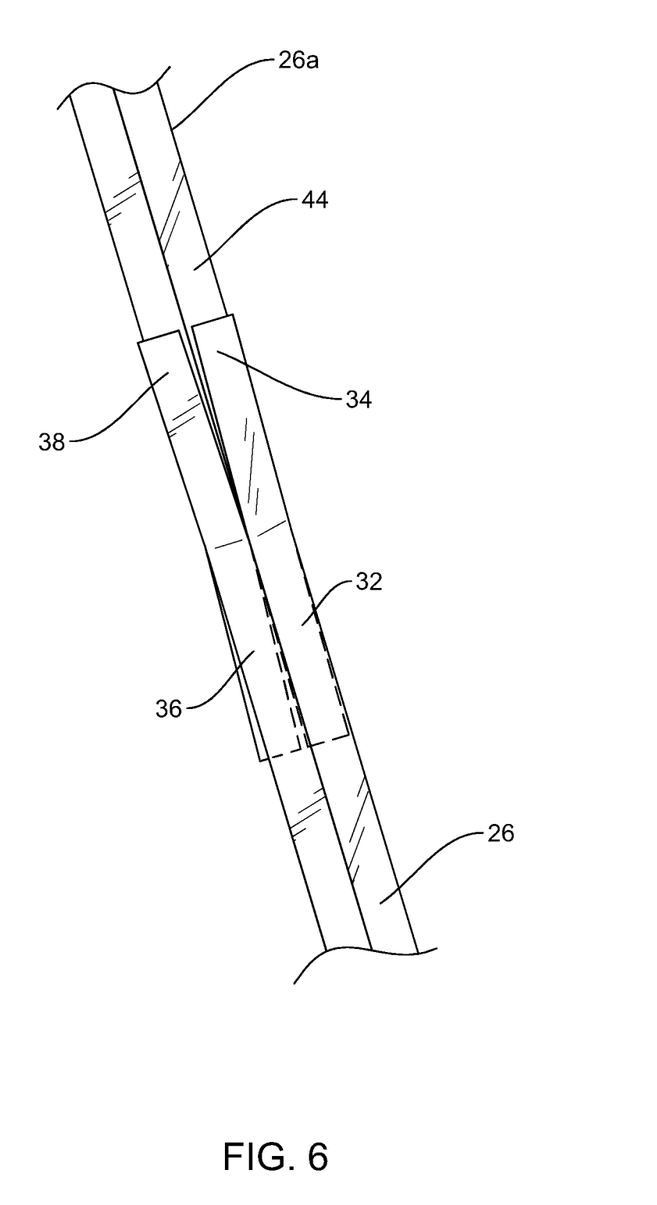
FIG. 6 is a top perspective truncated view of a first bar aligned with a second bar in accordance with an embodiment of the invention.
Figure 8:
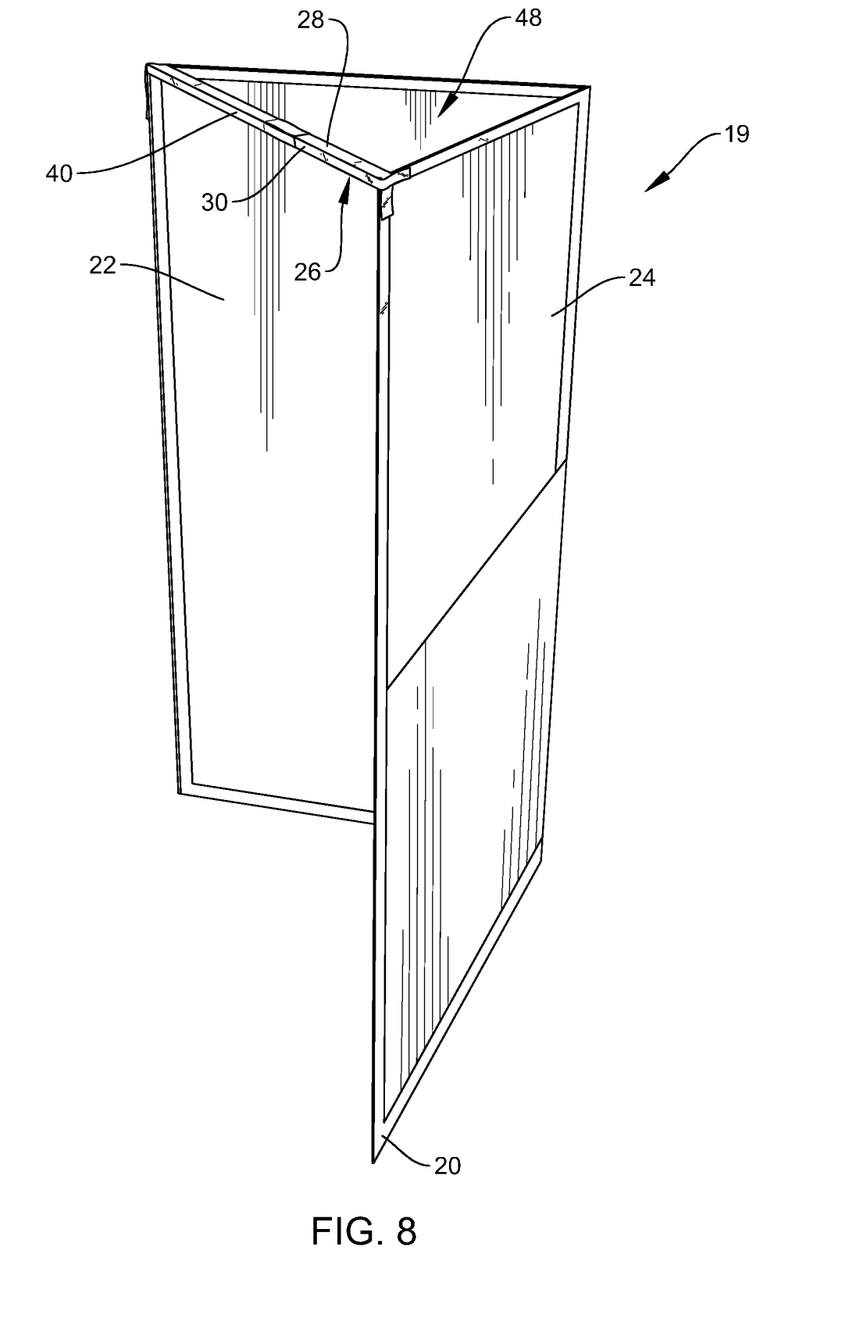
FIG. 8 is a side perspective view of a panel shown with a crossbar mounted thereon in accordance with an embodiment of the invention.

In embodiments of the invention, at least two bars 26 are provided which may be selectively joined together to form a crossbar (e.g. 40 as shown in FIG. 8). With reference to FIG. 6, an outer surface 44 of bar 26a is placed in contact with inner surface 42 of a cooperating bar 26 to form a unitary bar 40. It will be understood that respective Velcro surfaces of respective bars adhere the bars 26 to form a singular cross bar. As shown, respective tails (e.g. 34, 38) attach on the outside surface. Respective tails also attach on the inside surface (shown in dashed lines in FIG. 6).

In use, once a crossbar unit 40 is formed by joining two bars 26, 26a, the crossbar unit can be installed across the top of V Flat unit 19. The crossbar 40 adds stability to the V Flat unit and also provides a surface from which to hang backdrops, filters or the like.

Figure 7A:
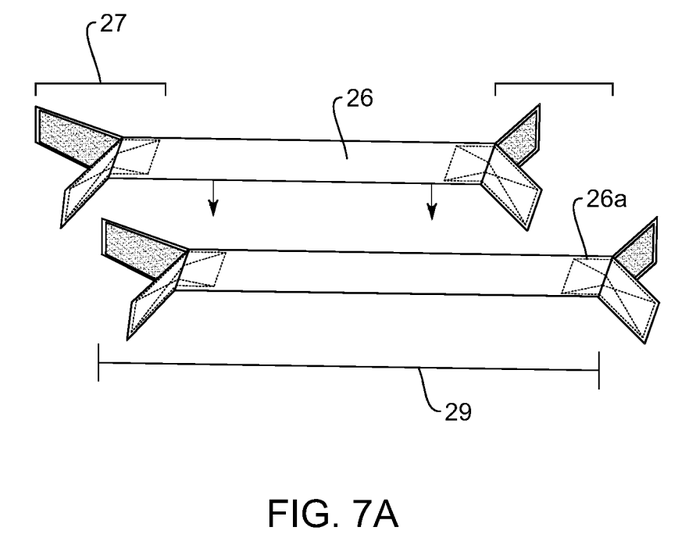
FIG. 7A is a schematic view a first bar aligned with a second bar to form a crossbar in accordance with an embodiment of the invention.
Figure 7B:
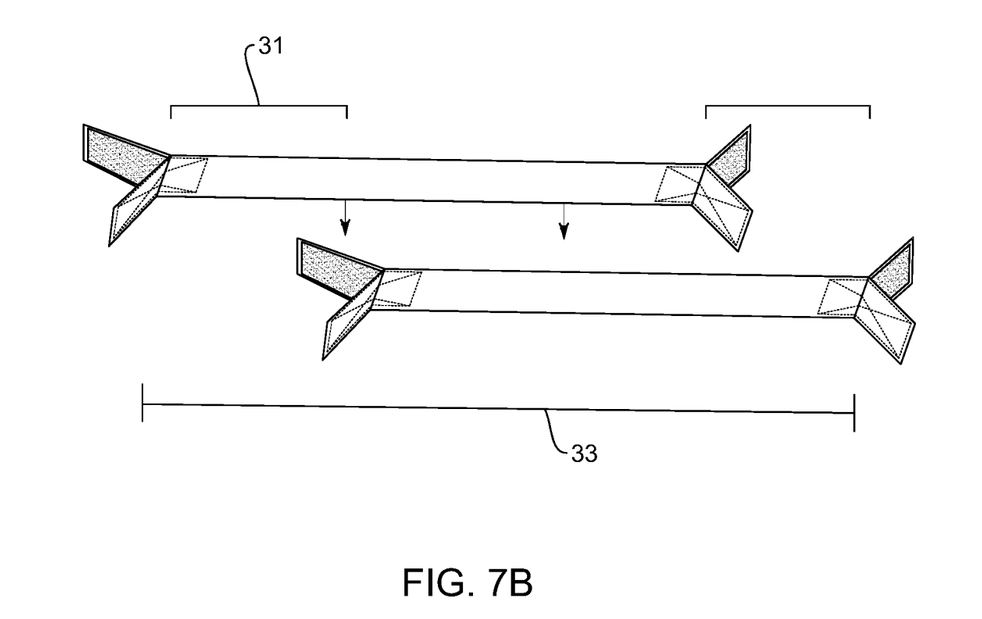
FIG. 7B is a schematic view a first bar aligned with a second bar to form a crossbar in accordance with an embodiment of the invention.

It will be understood that bars 26 can be joined at any of various positions (e.g. different lengths of overlap) depending on the desired ultimate length of crossbar 40 as needed to match the angle of an open V Flat 19. For example, with referent to FIG. 7A, a first bar 26 is shown positioned to be overlapping a second bar 26a. As shown, segments of respective bars that are non-overlapping (e.g. 27) are relatively short forming a crossbar of a relatively short length (shown schematically by line 29). With reference to FIG. 7B, however, segments of respective bars that are non-overlapping (e.g. 31) are longer than the arrangement shown in FIG. 7A, thereby forming a crossbar of a relatively longer length (shown schematically by line 33).

In embodiments of the invention, each bar 26 is provided with tails extending from both ends of each panel 28, 30 of bar 26, However, in other embodiments of the invention only one side of bar 26 is provided with a pair of extending tails and the other end is not provided with tails. In this embodiment, the non-tail ends are used to overlap when joining two bars and the ends having tails are used to attach to corners of V Flat 19.

Figure 9:
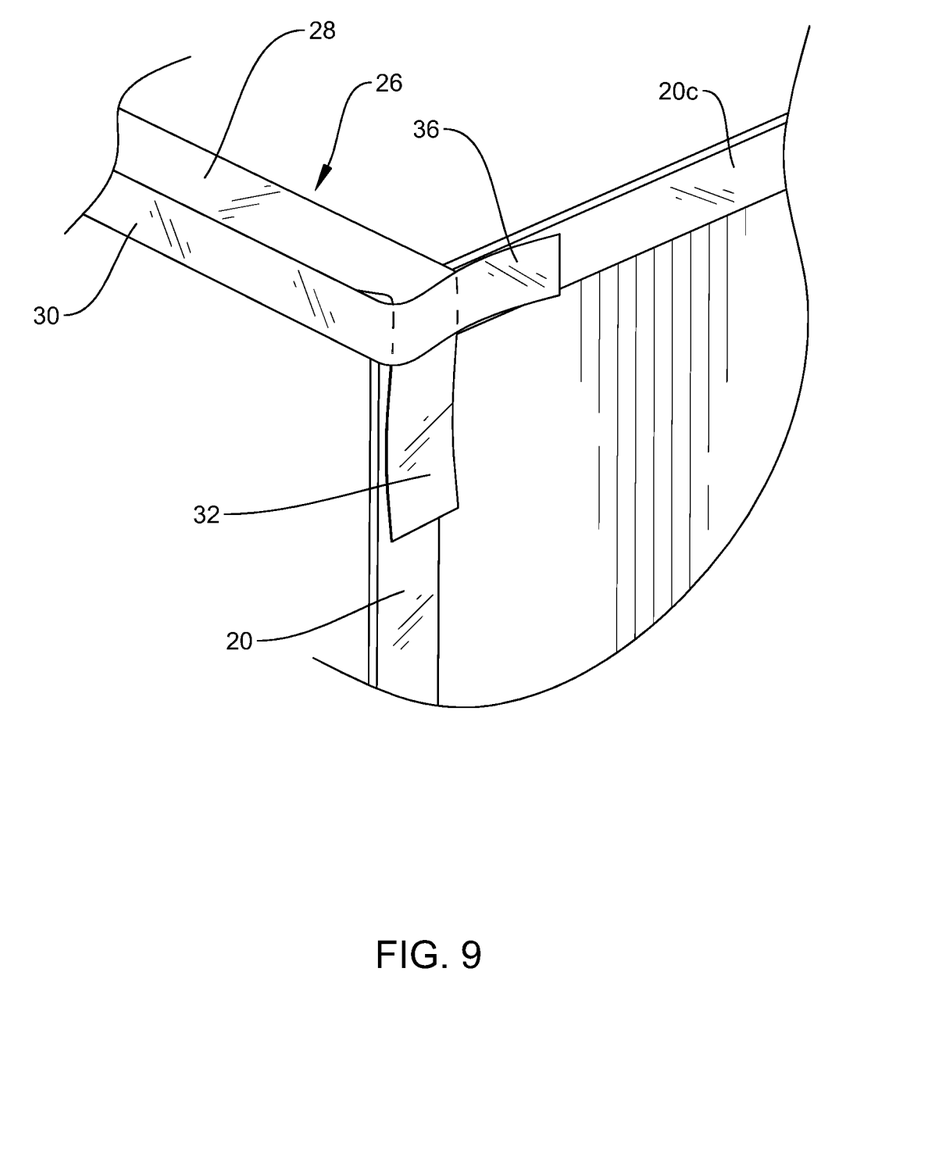
FIG. 9 is an enlarged view of the right side of the crossbar shown in FIG. 8 attached to a panel in accordance with an embodiment of the invention.

With reference to FIG. 8, crossbar 40 is shown bridging the top corners of panels 22, 24. In this regard, inner surface 42 of bar 26 is configured to contact and rest on a top edge of a panel. For example, as shown, an inner surface of first panel 28 of bar 26 rests on a top edge of panel 24 and an inner surface of a second panel 30 contacts a side edge of panel 24. As best shown in the enlarged view of FIG. 9, tail 32 extending from panel 28 is secured to vertical Velcro strip 20 on a rear aspect of panel 24. Tail 36 extending from panel 30 is secured to a horizontal Velcro strip 20c provided on a rear aspect of panel 24. A mirror attachment is made on the opposite side of V Flat unit 19—with respect to panel 22.

Figure 10:
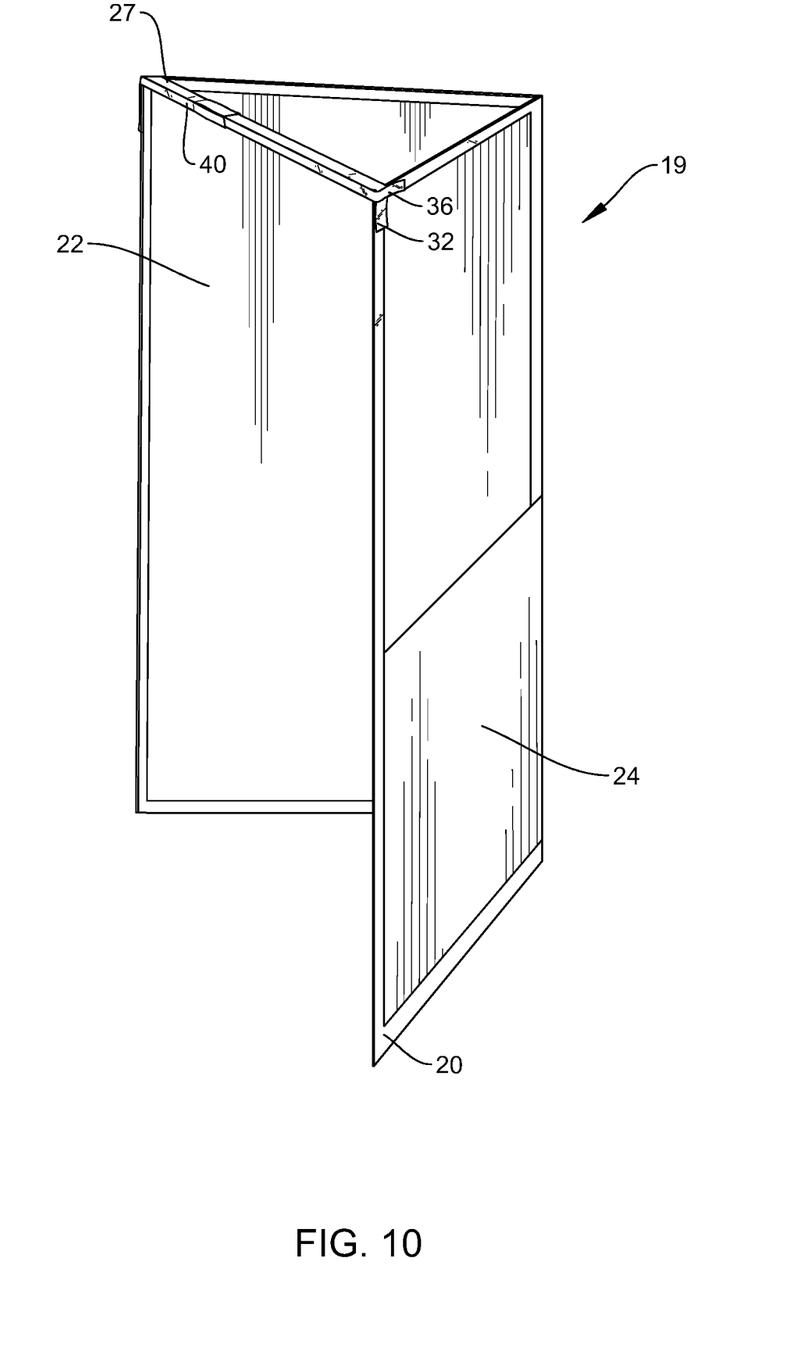
FIG. 10 is a side perspective view of a panel shown with a crossbar mounted thereon in accordance with an embodiment of the invention.
Figure 11:
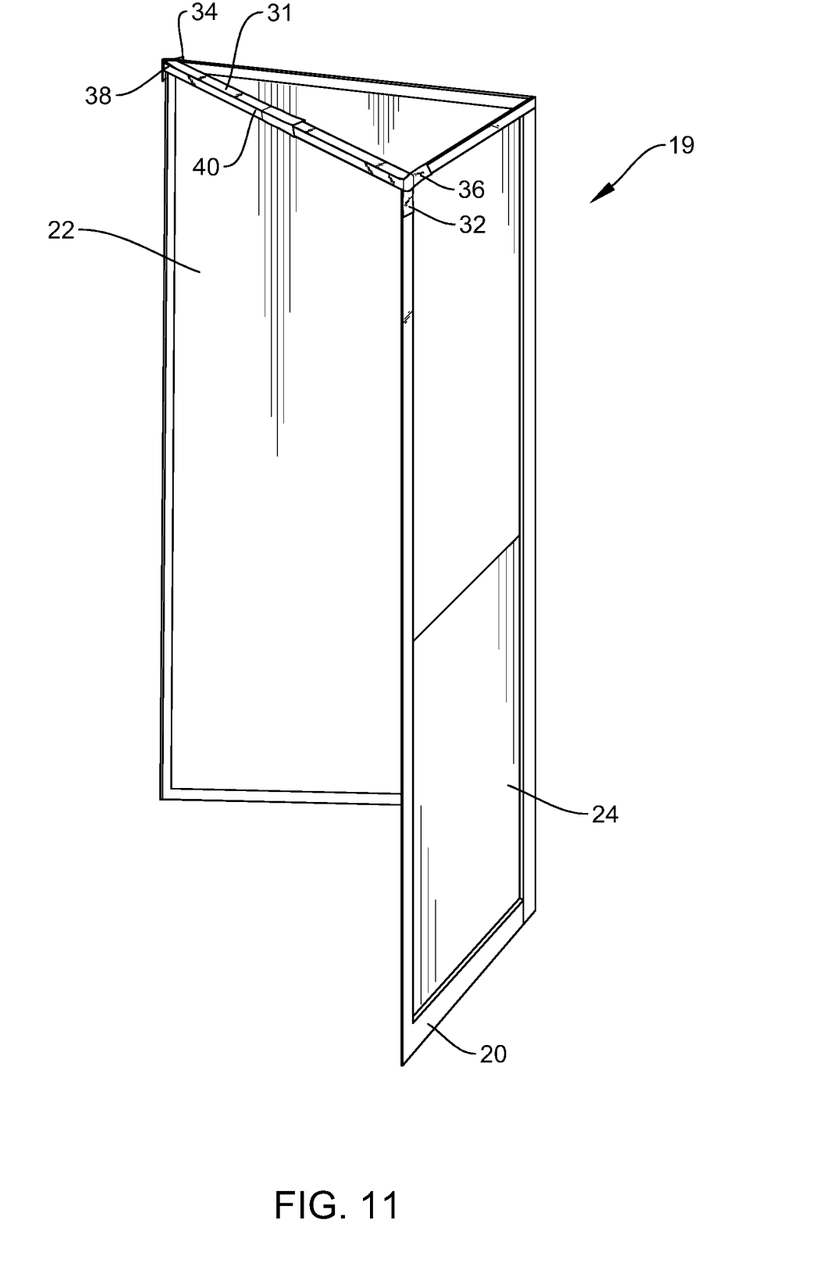
FIG. 11 is a side perspective view of a panel shown with a crossbar mounted thereon in accordance with an embodiment of the invention.

As described, V Flat unit 19 may be positioned at any of various angles and crossbar 40 may be formed of any various lengths to bridge the upper left and right edges of panels 22, 24, respectively. For example, with reference to FIG. 10, panels are formed at a sharp angle thereby creating a relatively small distance between upper (right and left) corners of panels 22, 24. Accordingly, as shown, a crossbar 40 is configured with a relatively small distance of non-overlap 27. FIG. 11, on the other hand, shows panels that are positioned at larger angle, thereby creating a greater distance between upper (right and left) corners of panels 22, 24 as compared to the configuration of FIG. 11. Accordingly, as shown, a crossbar 40 is configured with a larger distance of non-overlap 31 as compared to the arrangement of FIG. 10.

In embodiments of the invention, crossbar 40, which is covered in Velcro material, is configured to adhere a sheet or similar device. It will be understood that sheets and backdrops may be provided with Velcro or they are formed of a material that itself acts like either a hook and loop such that no separate Velcro is needed. In embodiments of the invention, a sheet or similar device may simply hung over crossbar 40 (without Velcro adhesion).

Figure 12:
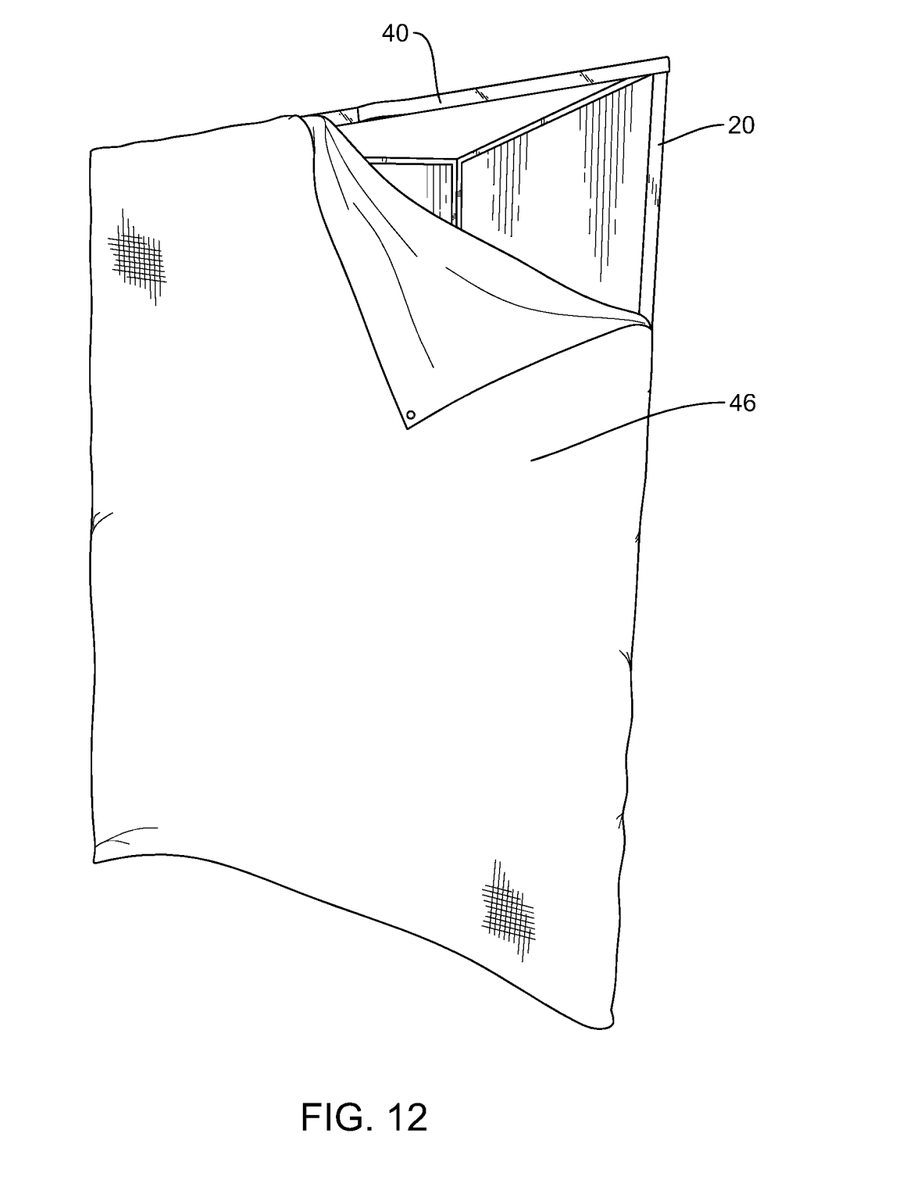
FIG. 12 is a front perspective view of a panel shown with a sheet mounted on a crossbar in accordance with an embodiment of the invention.

In embodiment of the invention, and as shown in FIG. 12, Velcro strips surrounding panels (e.g. 20) combined with Velcro surface of crossbar 40 form a frame for hanging sheets or similar devices. For example, as shown in FIG. 12, a backdrop 46 or similar sheet may be hung by adhering same to the Velcro of panels and the Velcro on the face of crossbar 40. It will be understood that in place of a backdrop, a semi-transparent sheet may be hung for the purpose of filtering/distributing light. In this embodiment, one or more lights may be placed in the space defined by the inside of the panels and behind the transparent sheet (see space identified as 48 in FIG. 8). Thus, the invention may be used as a light box in embodiments of the invention.

Embodiments of the invention provide a method of erecting a V Flat and a method of using a V Flat as a backdrop and/or light box. The method includes erecting a V Flat such that its panels are freestanding at an angle with respect to each other. The method further includes measuring the distance between a right upper corner and a left upper corner of the V flat. The method further includes the step of providing a first bar and connecting it to a second bar (whereby segments of each bar overlap with one another) such that a first end of a first bar and a second end of a second bar are spaced apart the approximate distance of between right upper corner and a left upper corner of the V flat. The first and second bar once connected form a crossbar. The crossbar is then placed in a manner whereby a first end of a first bar unit contacts the upper left corner of the V Flat and a second end of a second bar unit contacts the upper right corner of the V Flat. In embodiments, Velcro or similar hook and loop fasteners on the crossbar adhere to Velcro on the upper right and upper left corners of the V Flat panels.

While this invention has been described in conjunction with the embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A V Flat, comprising:
    a panel having a first panel section and a second panel section;
    Velcro provided on outer edges of the first panel section;
    a living hinge disposed between the first panel section and the second panel section;
    a first bar comprising a first panel having a first end and a second end, and a second panel having a first end and a second end, whereby the first panel is disposed substantially at a right angle to the second panel;
    a first tail extending from the first side of the first panel and a second tail extending from the first side of the second panel;
    a second bar comprising a third panel having a first end and a second end, and a fourth panel having a first end and a second end, whereby the third panel is disposed substantially at a right angle to the fourth panel;
    a third tail extending from the first side of the third panel and a fourth tail extending from the first side of the fourth panel;
    whereby the first bar is configured to overlap and adhere to the second bar;
    whereby the first tail is configured to adhere to a first surface of the first panel section and the second tail is configured to adhere to a second surface of the first panel; and
    whereby the third tail is configured to adhere to a first surface of the second panel section and the fourth tail is configured to adhere to a second surface of the second panel.

2. The V Flat of claim 1, whereby the panel is formed of a first layer of corrugated plastic.

3. The V Flat of claim 2, further comprising a second layer of corrugated plastic fused to the first layer of corrugated plastic.

4. The V Flat of claim 3, whereby the first layer of corrugated plastic is disposed at an orientation that is substantially opposite to the orientation of the first layer of corrugated plastic.

5. The V Flat of claim 1, whereby the first bar comprises an inner surface and an outer surface.

6. The V Flat of claim 5, whereby the second bar comprises an inner surface and an outer surface.

7. The V Flat of claim 6, whereby the outer surface of the second bar is configured to contact the inner surface of the first bar.

8. The V Flat of claim 7, whereby the inner surface of the second bar is configured to contact the outer surface of the first bar.

* * * * *